(No Model.)

J. & A. ZEHREN.
VALVE.

No. 373,000.  Patented Nov. 8, 1887.

Witnesses
Geo. W. Young.
N. E. Oliphant

Inventors
Jean Zehren
Auguste Zehren
By Stout & Underwood
Attorneys

UNITED STATES PATENT OFFICE.

JEAN ZEHREN AND AUGUSTE ZEHREN, OF PARIS, FRANCE.

VALVE.

SPECIFICATION forming part of Letters Patent No. 373,000, dated November 8, 1887.

Application filed April 25, 1887. Serial No. 236,127. (No model.) Patented in France April 10, 1886, No. 175,393.

*To all whom it may concern:*

Be it known that we, JEAN ZEHREN and AUGUSTE ZEHREN, of Paris, France, have invented certain new and useful Improvements in Valves for Steam and other Pipes, (for which French Letters Patent No. 175,393 were granted us the 10th day of April, 1886,) of which the following is a full, clear, and exact description, reference being had to the accompanying drawings, forming part of this specification, in which—

Figure 1:
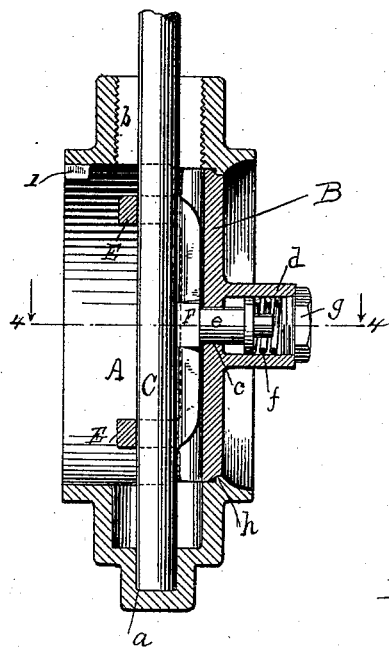
Figure 3:
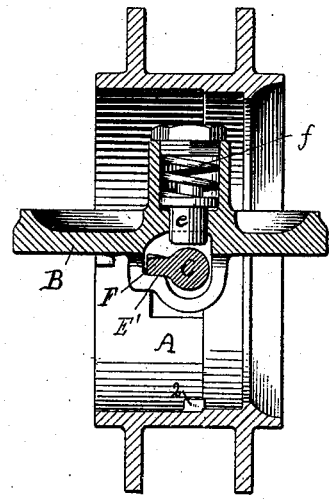
Figure 2:
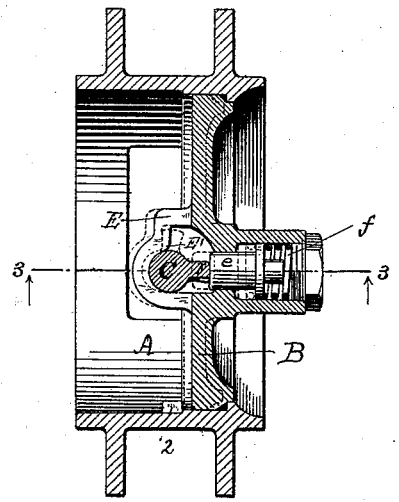

Figure 1 is a vertical central section showing the valve locked in its seat. Fig. 2 is a section on line 4 4, Fig. 1, with the valve closed;
and Fig. 3 is a section on line 3 3, Fig. 2, but with the valve opened.

A is the valve-chamber, B is the valve, and C the valve-rod.

The chamber A has a bearing, *a*, for one end of the valve-rod and an opening, *b*, for the reception of a stuffing-box that forms the bearing for the other end. The axis of the valve is out of center, and through the axis is an opening, *c*, leading from a housing, *d*, and in this opening is a plunger, *e*, which is backed by a spring, *f*, which is confined in the housing by a screw-cap, *g*.

The face of the valve B is turned down to fit in the valve-seat *h*, and on the lower inner portion of the chamber is a lug, 2, which has the effect of tipping the valve as it is lifted out of its seat, while another, lug 1, prevents the valve from making more than a half-revolution.

The valve-rod C has intermediate bearings in yokes E, that project from the valve, and these yokes are shouldered, as at E', to receive a web, F, that is formed on or attached to the valve-rod C, which web also serves to lock the valve in its seat.

The operation of our device is as follows:
The valve is closed by turning the valve-rod until its web strikes the plunger *e*, and when this occurs the valve will be carried to a vertical position, as in dotted lines, Fig. 2, and then as the rod is further turned its web, acting against the head of the plunger, will lock the valve tightly in its seat. To open the valve, it is only necessary to turn the valve-rod back, when the web, striking the shoulders E', will lift the valve from its seat, when the pressure in the pipe will turn it into the position shown in Fig. 3.

The valve is equally useful in steam, gas, or water pipes.

Having now fully described our invention, what we claim as new, and desire to secure by Letters Patent, is—

A valve hung eccentrically in its chamber, in combination with a webbed valve-rod located in its rear, a valve having a plunger projecting through it to engage with a web of the valve-rod as the valve is locked to its seat, and yokes through which the valve-rod passes, said yokes having shoulders with which the web of the valve-rod engages to unlock the valve, as set forth.

In witness whereof we have hereunto signed our names in the presence of two subscribing witnesses.

JEAN ZEHREN.
    AUGUSTE ZEHREN.

Witnesses:
 LÉON HUAREZ,
 JULES COSSAT.